US012646797B2

(12) United States Patent
Park et al.

(10) Patent No.:  US 12,646,797 B2
(45) Date of Patent:  Jun. 2, 2026

(54) BATTERY MODULE HAVING FIRE-EXTINGUISHING UNIT INCLUDING FIRE-EXTINGUISHING MATERIAL

(71) Applicant: LG ENERGY SOLUTION, LTD., Seoul (KR)

(72) Inventors: Jun Soo Park, Daejeon (KR); Bum Young Jung, Daejeon (KR); Han Young Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 505 days.

(21) Appl. No.: 17/794,551

(22) PCT Filed: Nov. 12, 2020

(86) PCT No.: PCT/KR2020/015839
§ 371 (c)(1),
(2) Date: Jul. 21, 2022

(87) PCT Pub. No.: WO2021/225237
PCT Pub. Date: Nov. 11, 2021

(65) Prior Publication Data
US 2023/0109116 A1     Apr. 6, 2023

(30) Foreign Application Priority Data

May 4, 2020     (KR) ........................ 10-2020-0053494

(51) Int. Cl.
H01M 50/209     (2021.01)
A62C 3/16     (2006.01)
(Continued)

(52) U.S. Cl.
CPC ...... H01M 50/383 (2021.01); H01M 2200/10 (2013.01)

(58) Field of Classification Search
CPC ........... H01M 2200/10; H01M 50/383; H01M 50/209; H01M 2200/00; H01M 2220/20;
(Continued)

(56) References Cited

U.S. PATENT DOCUMENTS

| 6,293,020 B1 * | 9/2001 | Julien | ...................... B26B 9/00 |
| | | | 76/DIG. 8 |
| 2002/0083598 A1 * | 7/2002 | Julien | ...................... B26B 9/00 |
| | | | 30/346.54 |

(Continued)

FOREIGN PATENT DOCUMENTS

| CN | 101682186 A | 3/2010 |
| CN | 205488409 U | 8/2016 |

(Continued)

OTHER PUBLICATIONS

Jae Man, KR 20190019461-A, English Translation, run 2024.*
(Continued)

*Primary Examiner* — Matthew T Martin
*Assistant Examiner* — Kevin Song
(74) *Attorney, Agent, or Firm* — Birch, Stewart, Kolasch & Birch, LLP

(57)     ABSTRACT

A battery pack has a fire-extinguishing unit including a fire-extinguishing material, and more particularly to a battery module having a fire-extinguishing unit including a fire-extinguishing material, the battery module including a plurality of battery cells stacked in a vertical direction or a horizontal direction and a fire-extinguishing unit located adjacent to each of the battery cells, wherein the fire-extinguishing unit includes a fire-extinguishing pack containing a fire-extinguishing material and at least one breaking unit interposed between the battery cell and the fire-extinguishing pack.

14 Claims, 6 Drawing Sheets

(51) Int. Cl.

| | |
|---|---|
| *A62C 35/10* | (2006.01) |
| *A62C 37/16* | (2006.01) |
| *H01M 10/42* | (2006.01) |
| *H01M 50/211* | (2021.01) |
| *H01M 50/24* | (2021.01) |
| *H01M 50/383* | (2021.01) |
| *H01M 50/609* | (2021.01) |
| *H01M 50/682* | (2021.01) |

(58) Field of Classification Search

CPC .... H01M 10/42; H01M 50/211; H01M 50/24; H01M 50/609; H01M 50/682; B26D 2001/002; B26D 2001/0033; B26D 2001/006; B26D 1/0006; Y02E 60/10; A62C 3/16; A62C 35/10; A62C 37/16

See application file for complete search history.

(56) References Cited

U.S. PATENT DOCUMENTS

| | | | |
|---|---|---|---|
| 2010/0331883 A1* | 12/2010 | Schmitz ......... A61B 17/320758 | |
| | | | 606/279 |
| 2011/0005781 A1 | 1/2011 | Yasui et al. | |
| 2011/0274951 A1 | 11/2011 | Yasui et al. | |
| 2014/0170447 A1 | 6/2014 | Woehrle et al. | |
| 2018/0090728 A1 | 3/2018 | Song | |
| 2018/0248160 A1* | 8/2018 | Lee ...................... H01M 10/48 | |
| 2019/0334146 A1* | 10/2019 | Lai ........................ A62C 31/00 | |

FOREIGN PATENT DOCUMENTS

| | | | | |
|---|---|---|---|---|
| CN | 106992327 A | | 7/2017 | |
| CN | 207474524 U | | 6/2018 | |
| EP | 3 340 337 A1 | | 6/2018 | |
| JP | 2009-219257 A | | 9/2009 | |
| JP | 2010-97836 A | | 4/2010 | |
| JP | 2010097836 A | * | 4/2010 | .............. A62C 3/16 |
| JP | 2012-252909 A | | 12/2012 | |
| JP | 2015-162285 A | | 9/2015 | |
| KR | 10-2007-0052375 A | | 5/2007 | |
| KR | 10-2014-0005323 A | | 1/2014 | |
| KR | 10-2016-0032843 A | | 3/2016 | |
| KR | 10-2017-0034330 A | | 3/2017 | |
| KR | 10-2018-0106447 A | | 10/2018 | |
| KR | 10-2018-0113809 A | | 10/2018 | |
| KR | 10-2019-0019461 A | | 2/2019 | |
| KR | 20190019461 A | * | 2/2019 | ......... H01M 2/0275 |
| KR | 10-2019-0041725 A | | 4/2019 | |
| KR | 10-2019-0041727 A | | 4/2019 | |
| WO | WO 2010/098067 A1 | | 9/2010 | |
| WO | WO 2012/172829 A1 | | 12/2012 | |

OTHER PUBLICATIONS

JP-2010097836-A Translation (Year: 2010).*
KR-20190019461-A Translation (Year: 2019).*
Extended European Search Report for European Application No. 20934601.4, dated Jul. 22, 2024.
International Search Report for PCT/KR2020/015839 (PCT/ISA/210) mailed on Feb. 18, 2021.
European Communication pursuant to Article 94(3) EPC for European Application No. 20 934 601.4, dated Jan. 14, 2025.

* cited by examiner

【FIG. 1】
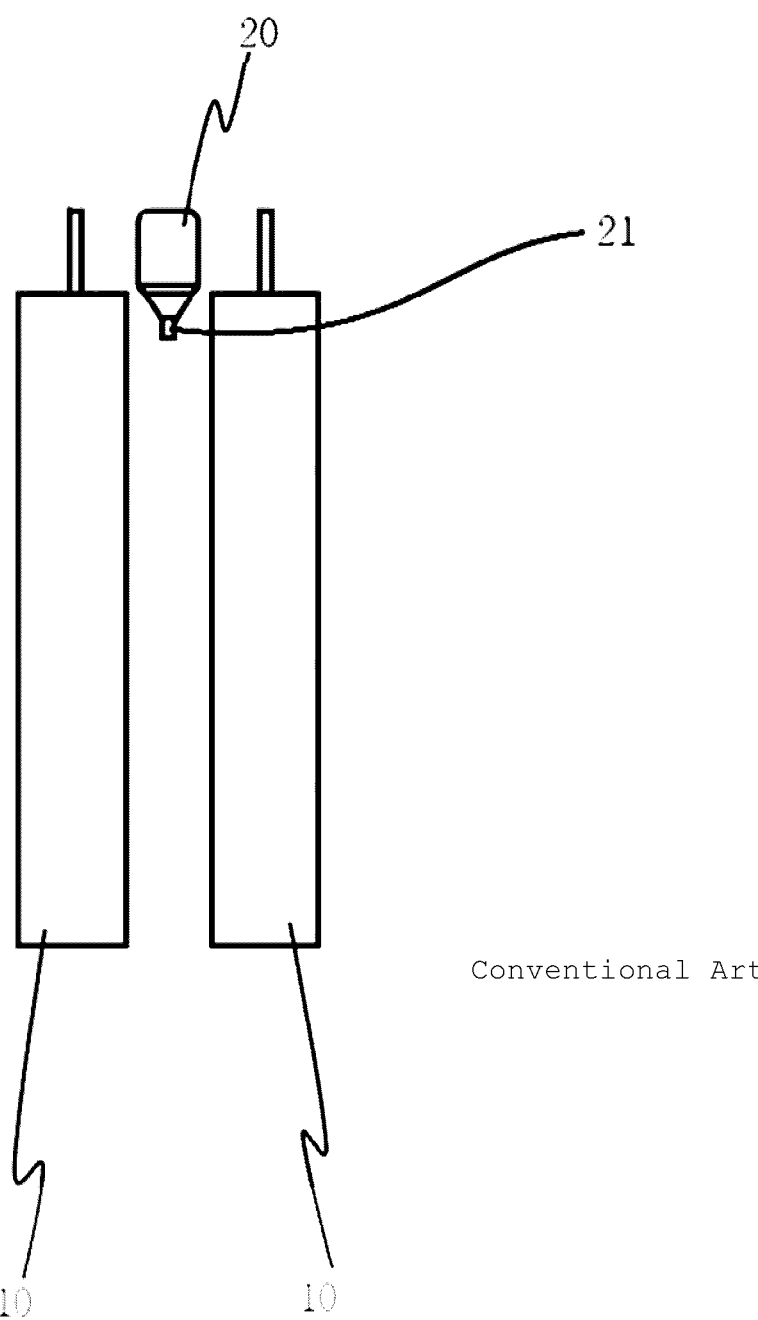
Conventional Art

【FIG. 2】
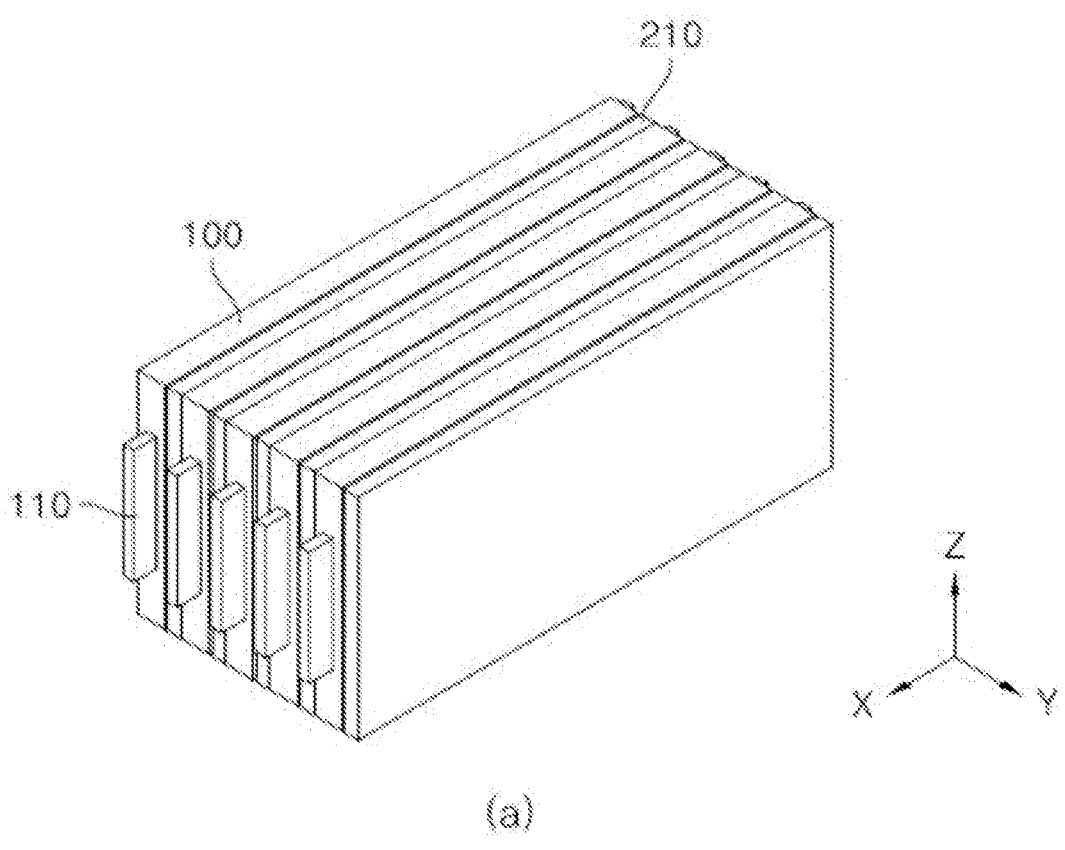
(a)
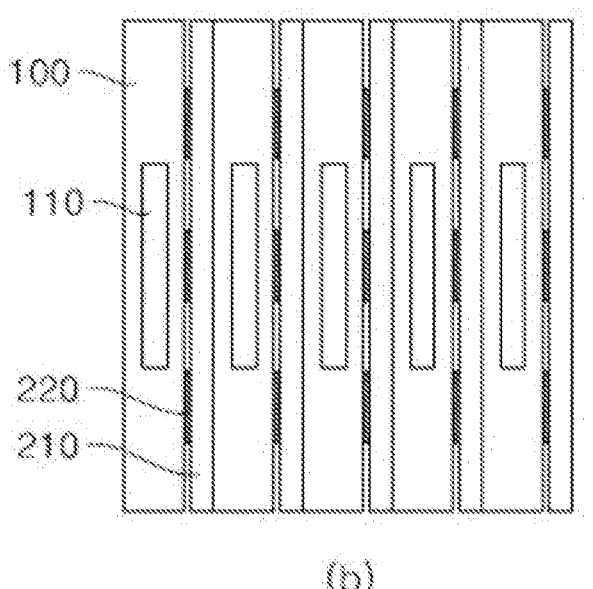
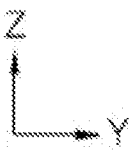
(b)

【FIG. 3】
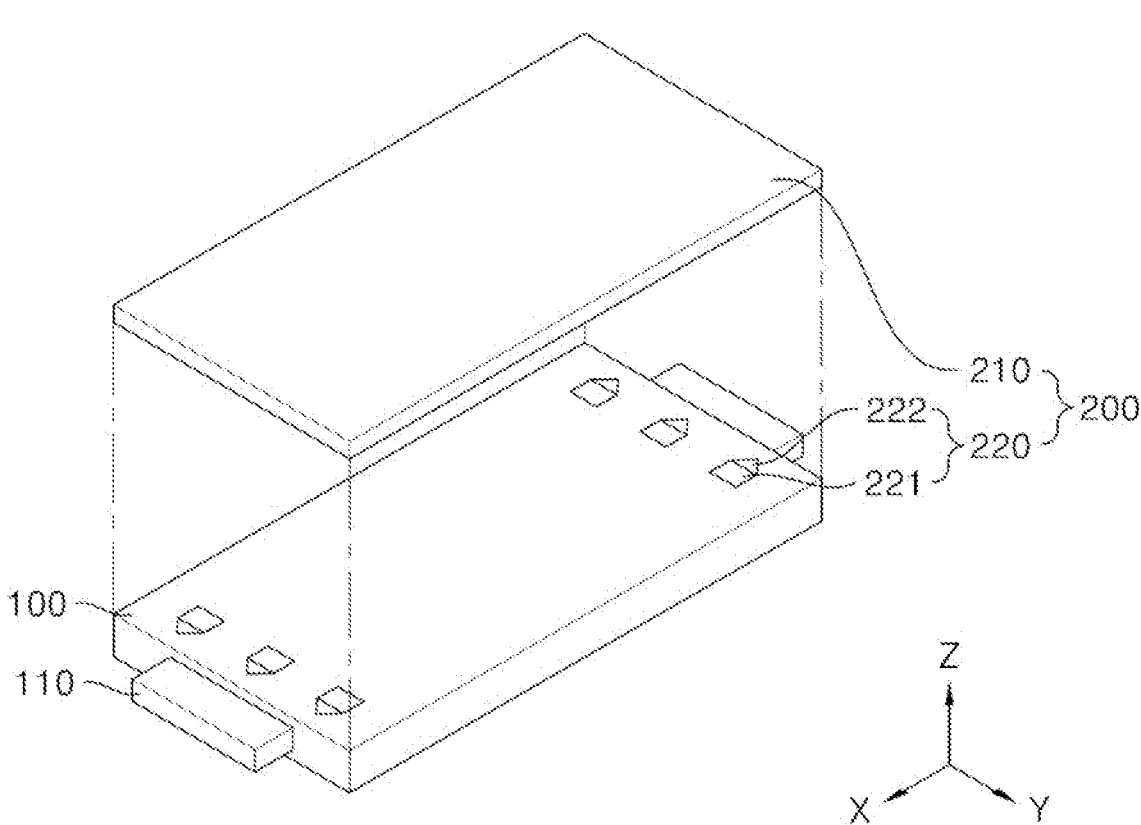

【FIG. 4】
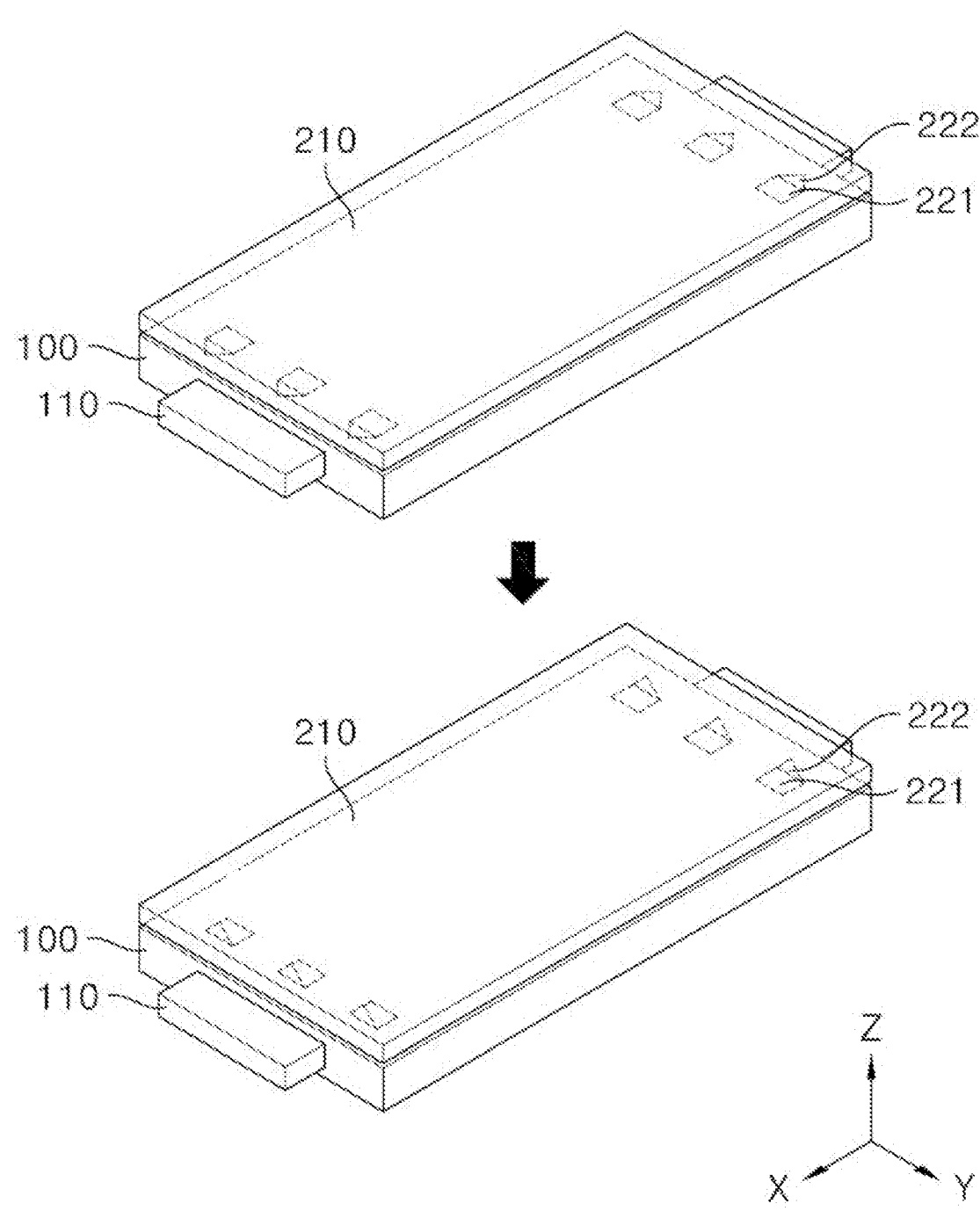

【FIG. 5】
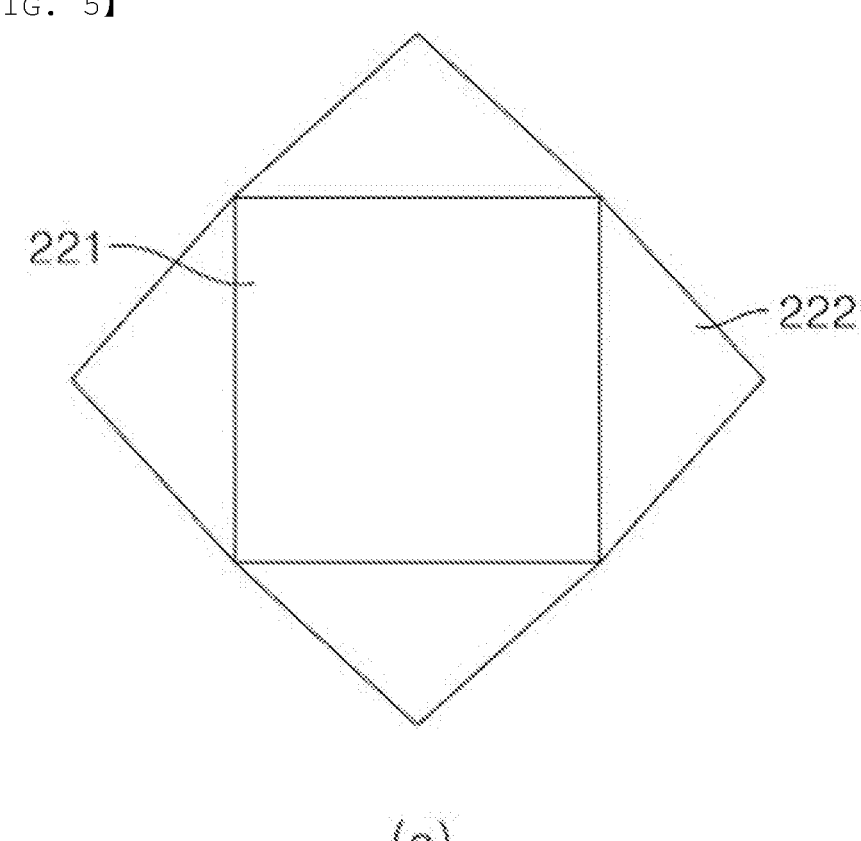
(a)
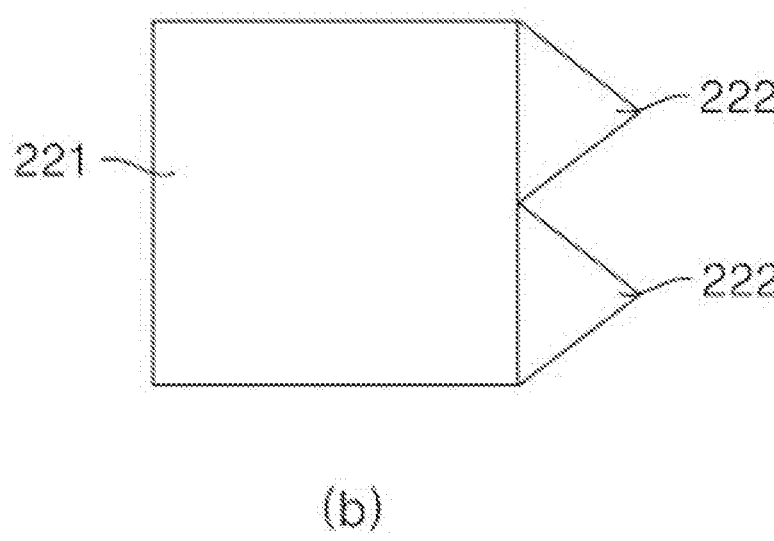
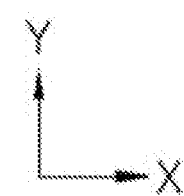
(b)

【FIG. 6】
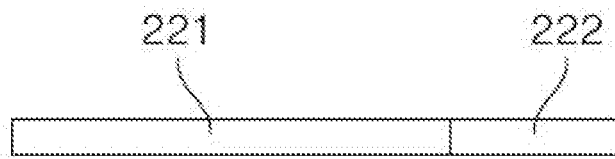
(a)
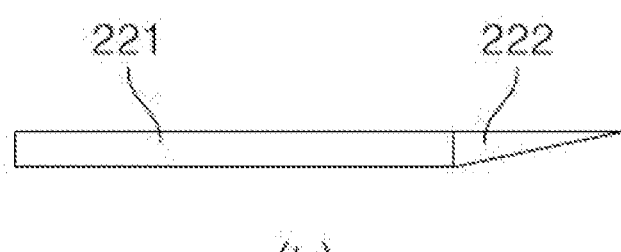
(b)
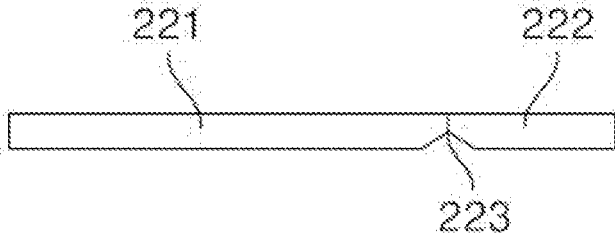
(c)
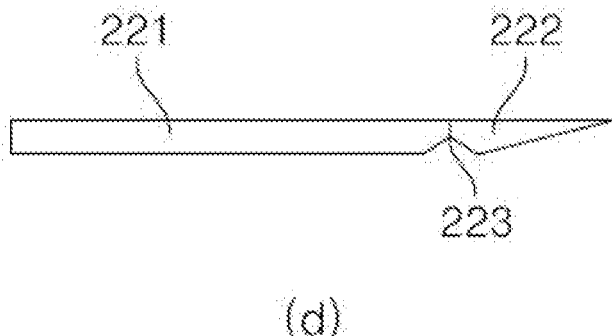
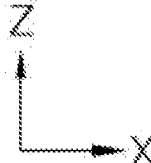
(d)

BATTERY MODULE HAVING FIRE-EXTINGUISHING UNIT INCLUDING FIRE-EXTINGUISHING MATERIAL

TECHNICAL FIELD

This application claims the benefit of priority to Korean Patent Application No. 2020-0053494 filed on May 4, 2020, the disclosure of which is incorporated herein by reference in its entirety.

The present invention relates to a battery module having a fire-extinguishing unit including a fire-extinguishing material, and more particularly to a battery module having a fire-extinguishing unit including a fire-extinguishing material capable of extinguishing fire in a battery cell without a sensing device when thermal runaway occurs in the battery cell, whereby it is possible to improve safety and energy density of the battery module.

BACKGROUND ART

A secondary battery, which has high ease of application based on product family and electrical characteristics, such as high energy density, has been universally applied to an electric vehicle (EV) or a hybrid electric vehicle (HEV) driven by an electrical driving source as well as portable devices. Such a secondary battery has attracted attention as a new energy source capable of enhancing environmental friendliness and energy efficiency in that the secondary battery has a primary advantage of remarkably reducing the use of fossil fuels and in that no by-products due to the use of energy are generated.

There are a lithium ion battery, a lithium polymer battery, a nickel-cadmium battery, a nickel-hydride battery, and a nickel-zinc battery as secondary batteries that are widely used at present. The operating voltage of such a unit secondary battery cell, i.e. a unit battery cell, is about 2.5V to 4.5V. In the case in which output voltage higher than the above operating voltage is required, therefore, a plurality of battery cells may be connected to each other in series to constitute a battery module.

Of course, a plurality of battery modules may be connected to each other in parallel or in series depending on required charge and discharge capacities to constitute a battery pack.

Meanwhile, in order to satisfy required output voltage, a plurality of battery cells is received in a battery module. The received battery cells are disposed in tight contact with each other in order to improve energy density. When an issue, such as thermal runaway, occurs, therefore, a secondary accident, such as outbreak of fire, may occur.

FIG. 1 is a perspective view illustrating a battery module having a conventional fire extinguisher. Referring to FIG. 1, the battery module is configured such that a fire extinguisher 20 containing a fire-extinguishing material is located between a plurality of battery cells 10 and such that a rupture portion (not shown), which is made of a shape memory alloy and which is formed in the shape of a spring having a pointed end, is provided in an injection portion 21 located at the lower part of the fire extinguisher 20. At ordinary times, the rupture portion is located so as to be shorter than the height of a clogged part of the injection portion 21. When heat is generated from the battery cells 10 due to thermal runaway or the like, the rupture portion is increased in length to form a hole in the injection portion 21 such that the fire-extinguishing material is injected therethrough.

In the conventional art, the rupture portion, the shape of which is changed depending on temperature, is surrounded by the injection portion 21 and is spaced apart from the battery cells 10, from which heat is generated, by a predetermined distance, whereby it is difficult to inject the fire-extinguishing material in a timely manner. Furthermore, an additional device and space are necessary to fix the fire extinguisher 20 in the battery module, whereby a manufacturing process is complicated and energy density is low.

PRIOR ART DOCUMENT (Patent Document 1) Korean Patent Application Publication No. 2019-0041725

DISCLOSURE

Technical Problem

The present invention has been made in view of the above problems, and it is an object of the present invention to provide a battery module having a fire-extinguishing unit including a fire-extinguishing material capable of sensitively responding to change in heat of the battery module to secure safety, whereby it is possible to reduce a secondary accident rate.

It is another object of the present invention to provide a battery module having a fire-extinguishing unit including a fire-extinguishing material capable of improving space utilization in the battery module while maintaining fire-extinguishing performance, whereby it is possible to improve energy density.

Technical Solution

In order to accomplish the above objects, a battery module according to the present invention includes a plurality of battery cells stacked in a first direction and a plurality of fire extinguishers respectively located adjacent to each of the plurality of battery cells, wherein each of the plurality of fire extinguishers includes a fire-extinguishing pack containing a fire-extinguishing material and at least one breaking unit interposed between a respective battery cell and the fire-extinguishing pack.

Also, in the battery module according to the present invention, the fire-extinguishing pack may be in direct contact with at least one surface of the respective battery cell.

Also, in the battery module according to the present invention, the breaking unit may be a coupler fixed to the respective battery cell or the fire-extinguishing pack and a blade extending from the coupler, and the blade may be made of a shape memory alloy.

Also, in the battery module according to the present invention, when the temperature of the respective battery cell increases to a predetermined temperature or higher, the blade may be deformed by a predetermined angle to rupture the fire-extinguishing pack.

Also, in the battery module according to the present invention, the breaking unit may be located adjacent to an electrode lead of the respective battery cell.

Also, in the battery module according to the present invention, the blade may be a plurality of blades along the edge of the coupler.

Also, in the battery module according to the present invention, the blade may extend so as to have a thickness equal to the thickness of the coupler.

Also, in the battery module according to the present invention, the blade may have a thickness gradually decreasing with increasing distance from the edge of the coupler.

Also, in the battery module according to the present invention, a recessed portion may be formed in the portion at which the blade portion and the coupler are connected to each other.

In addition, a battery pack according to the present invention includes the battery module.

Advantageous Effects

A battery module having a fire-extinguishing unit including a fire-extinguishing material according to the present invention has an advantage in that a breaking unit made of a shape memory alloy, which is deformed at a predetermined temperature or higher, is located in tight contact with a battery cell, whereby it is possible to extinguish fire without recognition through a separate sensing device, and therefore it is possible to prevent non-operation due to systemic errors.

In addition, the battery module according to the present invention has an advantage in that a sensing device configured to sense temperature or voltage of the battery module and a separate device configured to fix the breaking unit are not necessary, whereby a manufacturing process is simple and energy density is improved.

DESCRIPTION OF DRAWINGS

FIG. 1 is a perspective view illustrating extinguishment of fire in a battery module using a conventional fire-extinguishing unit.

FIG. 2 is a perspective view and a side front view of a battery module according to a first preferred embodiment of the present invention.

FIG. 3 is an exploded perspective view of a battery cell and a fire-extinguishing unit according to a first preferred embodiment of the present invention.

FIG. 4 is a view illustrating change of the fire-extinguishing unit depending on temperature in the battery cell according to the first preferred embodiment of the present invention.

FIG. 5 is a plan view illustrating breaking units according to second and third preferred embodiments of the present invention.

FIG. 6 is a sectional view illustrating breaking units according to preferred modifications of the present invention.

BEST MODE

In the present application, it should be understood that the terms "comprises," "has," "includes," etc. specify the presence of stated features, numbers, steps, operations, elements, components, or combinations thereof, but do not preclude the presence or addition of one or more other features, numbers, steps, operations, elements, components, or combinations thereof.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, a battery module having a fire-extinguishing unit including a fire-extinguishing material according to the present invention will be described with reference to the accompanying drawings.

FIG. 2 is a perspective view and a side front view of a battery module according to a first preferred embodiment of the present invention, and FIG. 3 is an exploded perspective view of a battery cell and a fire-extinguishing unit according to a first preferred embodiment of the present invention.

Referring to FIGS. 2 and 3, the battery module having the fire-extinguishing unit according to the present invention includes a plurality of battery cells 100 and a fire-extinguishing unit 200.

First, the plurality of battery cells 100 may be stacked side by side in a vertical direction or in a horizontal direction with respect to the ground and may be connected to each other in series and in parallel.

Here, it is preferable for each of the battery cells 100 to be a pouch-shaped battery cell including a cell assembly (not shown), a cell case, and a pair of electrode leads 110. The cell assembly may be a jelly-roll type cell assembly, which is configured to have a structure in which a long sheet type positive electrode and a long sheet type negative electrode are wound in the state in which a separator is interposed therebetween, a stacked type cell assembly including unit cells, each of which is configured to have a structure in which a rectangular positive electrode and a rectangular negative electrode are stacked in the state in which a separator is interposed therebetween, a stacked and folded type cell assembly, which is configured to have a structure in which unit cells are wound using a long separation film, or a laminated and stacked type cell assembly, which is configured to have a structure in which unit cells are stacked in the state in which a separator is interposed therebetween and are then attached to each other. However, the present invention is not limited thereto.

The cell assembly is mounted in the cell case. The cell case is generally configured to have a laminate sheet structure including an inner layer, a metal layer, and an outer layer. The inner layer is disposed in direct contact with the cell assembly, and therefore the inner layer must exhibit high insulation properties and high resistance to an electrolytic solution. In addition, the inner layer must exhibit high sealability in order to hermetically seal the cell case from the outside, i.e. a thermally-bonded sealed portion between inner layers must exhibit excellent thermal bonding strength. The inner layer may be made of a material selected from among a polyolefin-based resin, such as polypropylene, polyethylene, polyethylene acrylate, or polybutylene, a polyurethane resin, and a polyimide resin, which exhibit excellent chemical resistance and high sealability. However, the present invention is not limited thereto, and polypropylene, which exhibits excellent mechanical-physical properties, such as tensile strength, rigidity, surface hardness, and resistance to impact strength, and excellent chemical resistance, is the most preferably used.

The metal layer, which is disposed so as to abut the inner layer, corresponds to a barrier layer configured to prevent moisture or various kinds of gas from permeating into the battery from the outside. Aluminum film, which is light and easily shapeable, may be used as a preferred material for the metal layer.

The outer layer is provided on the other surface of the metal layer. The outer layer may be made of a heat-resistant polymer that exhibits excellent tensile strength, resistance to moisture permeation, and resistance to air transmission such that the outer layer exhibits high heat resistance and chemical resistance while protecting the cell assembly. As an example, the outer layer may be made of nylon or polyethylene terephthalate. However, the present invention is not limited thereto.

Meanwhile, the pair of electrode leads 110 includes a positive electrode lead and a negative electrode lead. The positive electrode lead and the negative electrode lead may be exposed outwards from the cell case in the state in which positive electrode tabs and negative electrode tabs of the cell assembly are electrically connected to the positive electrode lead and the negative electrode lead, respectively, or the positive electrode lead and the negative electrode lead may be directly connected to the cell assembly without electrode tabs. The battery cells correspond to commonly known constructions, and therefore a more detailed description thereof will be omitted.

Next, the fire-extinguishing unit 200 will be described in detail. The fire-extinguishing unit 200 includes a fire-extinguishing pack 210 and a breaking unit 220. The fire-extinguishing pack 210 may have defined therein a space configured to receive a fire-extinguishing material, and may be made of at least one of a polyolefin-based resin, such as polypropylene, polyethylene, polyethylene acrylate, or polybutylene, polytetrafluoroethylene, a polyurethane resin, and a polyimide resin, each of which has a predetermined thickness that can be torn by the breaking unit 220. In addition, the fire-extinguishing pack 210 may be located at one surface or opposite surfaces of each of the battery cells 100, and may be prismatic, which is similar to the outer shape of the battery cell 100. However, the fire-extinguishing pack 210 may be amorphous, whereby the shape of the fire-extinguishing pack may be freely changed.

A fire-extinguishing material configured to inhibit an increase in temperature of the battery cells 100 to a predetermined temperature or higher or flames generated by outbreak of fire is contained in the fire-extinguishing pack 210. At least one of inorganic carbonate, inorganic phosphate, inorganic sulfate, sodium bicarbonate, potassium bicarbonate, and ammonium phosphate monobasic may be used as an example of the fire-extinguishing material. However, the fire-extinguishing material is not particularly restricted as long as the fire-extinguishing material is a material having a fire-extinguishing function.

Here, it is more preferable for the fire-extinguishing material to be liquid such that the fire-extinguishing material can be rapidly discharged, although the fire-extinguishing material may be powder.

The breaking unit 220 includes a coupling portion 221 fixed to a predetermined part of the battery cell 100 or the fire-extinguishing pack 210 and a blade portion 222 extending from the edge of one side of the coupling portion 221.

The coupling portion 221 is fixed to the battery cell 100 or the fire-extinguishing pack 210 in order to prevent movement of the breaking unit 220. The blade portion 222 tears or breaks the fire-extinguishing pack 210 in order to discharge the fire-extinguishing material contained therein.

Here, it is preferable for the blade portion 222 to be configured such that the width of the blade portion (Y-axis direction) gradually decreases with increasing distance from the coupling portion 221 so as to have a pointed shape.

Meanwhile, it is preferable for the breaking unit 220 to be made of a shape memory alloy such that the shape of the blade portion 222 is changed by a predetermined temperature or higher, which will be described below in more detail.

The position of the breaking unit 220 is not particularly restricted as long as the breaking unit 220 comes into tight contact with the fire-extinguishing pack 210. Preferably, the breaking unit 220 is located in the vicinity of each of the electrode leads 110. More preferably, two or more breaking units 220 are provided. The reason for this is that, when heat is generated from the battery cell 100 due to overcharging, a larger amount of heat is generated in the vicinity of each of the electrode leads 110, and therefore it is possible to more rapidly discharge the fire-extinguishing material in the case in which two or more breaking units 220 are provided in the vicinity of each of the electrode leads 110.

FIG. 4 is a view illustrating change of the fire-extinguishing unit based on temperature in the battery cell according to the first preferred embodiment of the present invention.

Referring to FIG. 4, the shape of the breaking unit 220 is changed when the breaking unit is heated to a predetermined temperature or higher, since the breaking unit is made of a shape memory alloy, the shape of which is changed depending on temperature, as previously described.

That is, when the battery cell 100 is repeatedly charged and discharged in a normal state, as shown in FIG. 4, the coupling portion 221 and the blade portion 222 are simply disposed in tight contact between the battery cell 100 and the fire-extinguishing pack 210. However, when thermal runaway occurs due to overcharging and thus the temperature of the battery cell increases to a predetermined temperature or higher, for example 100° C. or higher, heat is transferred to the breaking unit 220, whereby the blade portion 222 rises by a predetermined angle, i.e. the shape of the blade portion is changed.

A portion of the fire-extinguishing pack 210 ruptures as the result of deformation of the blade portion 222. As a result, the fire-extinguishing material contained in the fire-extinguishing pack is ejected to control overheating or fire of the battery cell 100.

Since the breaking unit 220 according to the present invention is a thin flat plate that is located between the battery cell 100 and the fire-extinguishing pack 210 and that is made of a shape memory alloy, which is deformed depending on temperature, as described above, a space occupied by the breaking unit is small, unlike a sensing device configured to sense temperature and voltage, whereby space utilization is improved, and therefore it is possible to improve energy density of the battery module.

Here, the shape memory alloy, of which the breaking unit 220 is made, may include at least one of a nickel-titanium (Ni—Ti) alloy, a copper-zinc (Cu—Zn) alloy, a copper-zinc-aluminum (Cu—Zn—Al) alloy, a copper-cadmium (Cu—Cd) alloy, a nickel-aluminum (Ni—Al) alloy, and a copper-aluminum-nickel (Cu—Al—Ni) alloy, the shape of each of which is changed due to crystal structure change when heated to a predetermined temperature or higher.

In the case in which the fire-extinguishing pack 210 is located at one side or opposite sides of the battery cell 100 and the breaking unit 220, which is made of a shape memory alloy, is located between the battery cell 100 and the fire-extinguishing pack 210, as described above, the fire-extinguishing material is discharged from the fire-extinguishing pack 210 when the temperature of the battery cell 100 abnormally increases, whereby it is possible to rapidly inhibit outbreak of fire. In addition, no complicated sensing device or no installation space is necessary, and therefore it is possible to simplify a manufacturing process and to improve energy density.

FIG. 5 is a plan view illustrating breaking units according to second and third preferred embodiments of the present invention.

Referring to FIG. 5, (a) of FIG. 5 is a plan view of the breaking unit 220 according to the second preferred embodiment of the present invention, wherein four blade portions 222 are formed along the edge of a quadrangular coupling portion 221.

In the breaking unit 220 according to the second embodiment, when thermal runaway occurs in the battery cell 100 due to overcharging, the four blade portions 222 rise by a predetermined angle to rupture a portion of the fire-extinguishing pack 210. Consequently, it is possible to induce rapid discharge of the fire-extinguishing material while reducing the installation number of the breaking unit 220.

In the breaking unit 220 according to the third embodiment shown in (b) of FIG. 5, two blade portions 222 are formed at one side of a quadrangular coupling portion 221.

In the breaking unit 220 according to the third embodiment, when thermal runaway occurs in the battery cell 100 due to overcharging, the two blade portions 222 rise by a predetermined angle to rupture a portion of the fire-extinguishing pack 210. Consequently, it is possible to induce rapid discharge of the fire-extinguishing material while reducing the installation number of the breaking unit.

Of course, two blade portions 222 according to the third embodiment may be provided at one side of the quadrangular coupling portion 221 according to the second embodiment, the shape of the coupling portion 221 may be polygonal, for example triangular, pentagonal, hexagonal, or octagonal, or circular, and three or more blade portions 222 may be formed at the edge of one side of the coupling portion.

FIG. 6 is a sectional view illustrating breaking units according to preferred modifications of the present invention.

Referring to FIG. 6, the breaking unit 220 may be configured such that a coupling portion 221 and a blade portion 222 extend so as to have the same thickness, as shown in (a) of FIG. 6. In this case, it is possible to easily manufacture the breaking unit.

The breaking unit 220 shown in (b) of FIG. 6 is configured such that a blade portion 222 extending from a flat coupling portion 221 has a thickness gradually decreasing with increasing distance from the edge of the coupling portion 221, specifically the blade portion has a triangular shape somewhat spaced apart from one side of the battery cell 100. In this case, the tip end of the blade portion 222 is very sharp, whereby it is possible to easily rupture the fire-extinguishing pack 210.

The breaking unit 220 shown in (c) of FIG. 6 is configured such that a coupling portion 221 and a blade portion 222 extend so as to have the same thickness, in the same manner as shown in (a) of FIG. 6, and a recessed portion 223 having a predetermined depth is further formed in the portion at which the coupling portion 221 and the blade portion 222 are connected to each other. When heat is generated from the battery cell 100, therefore, the blade portion 222 may be more sensitively deformed.

The breaking unit 220 shown in (d) of FIG. 6 is configured such that a blade portion 222 extending from a flat coupling portion 221 has a thickness gradually decreasing with increasing distance from the edge of the coupling portion 221, in the same manner as shown in (b) of FIG. 6, and a recessed portion 223 having a predetermined depth is formed in the portion at which a coupling portion 221 and the blade portion 222 are connected to each other. Consequently, the blade portion 222 may be easily deformed, as described with reference to (c) of FIG. 6. Although the recessed portion 223 is shown as being provided at only one side of the coupling portion in the figures, one recessed portion may be provided at each of opposite sides of the coupling portion.

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and the technical idea of the present invention, and it will be obvious that such changes and modifications fall within the scope of the appended claims.

DESCRIPTION OF REFERENCE NUMERALS

100: Battery cell
110: Electrode lead
200: Fire-extinguishing unit
210: Fire-extinguishing pack
220: Breaking unit
221: Coupling portion
222: Blade portion
223: Recessed portion

The invention claimed is:

1. A battery module having a fire-extinguishing unit, the battery module comprising:
   a plurality of battery cells stacked in a first direction; and
   a plurality of fire extinguishers stacked in the first direction and respectively located between the plurality of battery cells,
   wherein each of the plurality of fire extinguishers comprises a fire-extinguishing pack containing a fire-extinguishing material and at least one breaking unit interposed between a respective battery cell and the fire-extinguishing pack,
   wherein the breaking unit comprises:
   a coupler fixed to the respective battery cell or the fire-extinguishing pack; and
   a blade extending from the coupler, and
   wherein the blade is configured to move relative to the fire-extinguishing pack and the coupler to pierce the fire-extinguishing pack.

2. The battery module according to claim 1, wherein the fire-extinguishing pack is in direct contact with at least one surface of the respective battery cell.

3. The battery module according to claim 1, wherein the blade is made of a shape memory alloy.

4. The battery module according to claim 3, wherein, when a temperature of the respective battery cell increases to a predetermined temperature or higher, the blade is deformed by a predetermined angle to rupture the fire-extinguishing pack.

5. The battery module according to claim 1, wherein the at least one breaking unit is located adjacent to an electrode lead of the respective battery cell.

6. The battery module according to claim 3, wherein the blade is a plurality of blades along an edge of the coupler.

7. The battery module according to claim 3, wherein the blade has a thickness equal to a thickness of the coupler.

8. The battery module according to claim 3, wherein the blade has a thickness gradually decreasing with increasing distance from an edge of the coupler.

US 12,646,797 B2

9

9. The battery module according to claim 7, wherein a recessed portion is formed in a portion at which the blade and the coupler are connected to each other.

10. A battery pack comprising the battery module according to claim 1.

11. The battery module according to claim 8, wherein a recessed portion is formed in a portion at which the blade and the coupler are connected to each other.

12. The battery module according to claim 1, wherein the coupler is fixed to the respective battery cell.

13. The battery module according to claim 1, wherein the blade has a triangular shape, and
wherein a side of the blade attaches to the coupler.

14. The battery module according to claim 1, wherein the coupler is rectangular, and
wherein the blade is a triangular blade attached to each edge of the coupler.

* * * * *

10